United States Patent [19]

Martinez et al.

[11] Patent Number: 5,211,564
[45] Date of Patent: May 18, 1993

[54] COMPUTERIZED FIGURAL RESPONSE TESTING SYSTEM AND METHOD

[75] Inventors: Michael E. Martinez, Irvine, Calif.; Jeffrey B. Jenkins, Newtown, Pa.

[73] Assignee: Educational Testing Service, Princeton, N.J.

[21] Appl. No.: 691,396

[22] Filed: Apr. 25, 1991

Related U.S. Application Data

[63] Continuation-in-part of Ser. No. 382,716, Jul. 19, 1989, Pat. No. 5,011,413.

[51] Int. Cl.$^5$ .................................................. G09B 7/00
[52] U.S. Cl. .................................... 434/323; 434/322; 434/327; 434/362; 382/48; 340/724; 341/12; 395/159; 395/161
[58] Field of Search ............... 434/307, 322–325, 434/327, 335–338, 350, 362, 72, 80, 112, 169, 185; 382/48; 340/706, 724, 727, 709; 341/5, 12, 14; 358/75, 96; 395/155, 159, 161; 364/410

[56] References Cited

U.S. PATENT DOCUMENTS

| | | | |
|---|---|---|---|
| 3,382,588 | 6/1968 | Serrell et al. | 434/335 |
| 3,501,851 | 3/1970 | Price, Jr. et al. | 434/325 |
| 3,761,877 | 9/1973 | Fernald | 434/337 |
| 3,963,866 | 6/1976 | Tanie | 358/96 |
| 4,360,345 | 11/1982 | Hon | 434/323 X |
| 4,475,239 | 10/1984 | van Raamsdonk | 382/59 |
| 4,518,361 | 5/1985 | Conway | 434/362 |
| 4,547,161 | 10/1985 | Manning | 434/358 |
| 4,593,904 | 6/1986 | Graves | 434/323 X |
| 4,656,507 | 4/1987 | Greaves et al. | 358/96 |
| 4,686,522 | 8/1987 | Hernandez et al. | 340/709 |
| 4,813,013 | 3/1989 | Dunn | 395/159 |
| 4,897,736 | 1/1990 | Sugino | 358/75 |
| 4,931,018 | 6/1990 | Herbst et al. | 273/DIG. 28 X |
| 4,967,322 | 8/1990 | Tenma et al. | 434/72 X |
| 5,002,491 | 3/1991 | Abrahamson et al. | 434/350 X |
| 5,011,413 | 4/1991 | Ferris et al. | 434/358 |
| 5,040,131 | 8/1991 | Torres | 395/159 X |
| 5,100,329 | 3/1992 | Dusen et al. | 434/327 |

FOREIGN PATENT DOCUMENTS

0015088  1/1991  Japan .................................. 434/72

Primary Examiner—Richard J. Apley
Assistant Examiner—Joe H. Cheng
Attorney, Agent, or Firm—Woodcock, Washburn, Kurtz, Mackiewicz & Norris

[57] ABSTRACT

A method and system for interactive test taking is provided, having a computer with memory, an image display screen, and a pointing device such as a mouse for examinee manipulation of symbols or objects on the screen. Starting figural material is presented on the screen along with a problem statement requiring responses relative to the starting figural material. The examinee inputs response data through the mouse, manipulating and/or generating symbols on the screen in relation to the starting figural material. Scoring of the examinee's responses is done on-line or after completion of all tasks, and may include an evaluation of the sequence of examinee responses to respective items, as well as an evaluation of the duration of the examinee's response or any component of such response to an item.

21 Claims, 8 Drawing Sheets

COMPUTERIZED FIGURAL RESPONSE TESTING SYSTEM AND METHOD

CROSS-REFERENCE TO RELATED APPLICATION

This application is a continuation-in-part of pending application Ser. No. 382,716, Machine-Interpretable Figural Response Testing, filed Jul. 19, 1989 now U.S. Pat. No. 5,011,413, and assigned to the same assignee as this application.

FIELD OF THE INVENTION

This invention relates to systems and methods for computerized testing and, more particularly, to computerized testing systems for administering and scoring tests characterized by computerized manipulation and construction of figural responses.

BACKGROUND OF THE INVENTION

Large-scale standardized tests are generally limited to certain cognitive processes and behaviors that they require of examinees. Multiple-choice questions have been favored because they can be scored objectively, quickly and at low cost. Scores derived from multiple-choice questions typically have good predictive and concurrent validity. However, such questions generally only test for recognition of correct answers and do not require constructed responses which more appropriately conform to the kinds of behavior that teachers want their students to express. More generally, standardized test questions are perceived as failing to elicit the full range of desirable cognitive processes, which for many educators include thinking critically, synthesizing ideas, and formulating and carrying out plans.

Multiple-choice questions, or items, are frequently the target of the above criticism, in part because they are commonly thought to require no more than recall of information. Moreover, in answering multiple-choice questions, examinees might capitalize on abilities that have little to do with the construct being measured. For example, researchers have identified a response elimination strategy whereby examinees eliminate implausible distractors, and then guess from the remaining options. Unless the target construct is intended to embrace such strategizing, error is introduced because the items discriminate on the basis of abilities that lie beyond the pale of the construct. For these and other reasons for dissatisfaction with multiple-choice testing, there has been an effort to try to develop alternatives. The products of these efforts have included performance and portfolio-based assessments. As discussed in the above cross-referenced application Ser. No. 382,716, incorporated herein by reference, an additional alternative is the use of figural response items. Figural response testing differs from multiple-choice in at least two ways. First, figural response items call for constructed responses, i.e., answers made up in the mind of the examinee rather than chosen from a list of options. A second feature of figural response items is their dependence upon figural material, such as illustrations and graphs, as the response medium. The examinee responds to questions or directions by carrying out operations on a figure, or on a background containing figural representations. The cross-referenced patent provides illustrations of figural response items where the examinee forms the task by manually making one or more marks in relation to the background figural media, i.e., graphs, illustrations, and diagrams.

Our investigations have shown that figural response tasks, or items, are found to be somewhat more difficult and also more reliable (predictive of overall ability) than multiple-choice items. It is expected that figural response testing will reduce or eliminate the utility of strategies as are known to be employed in multiple-choice testing, thereby enhancing the estimates of the target proficiency. Constructed response items have also been shown to be particularly useful for diagnosis, since examinees are unconstrained and uncued in the expression in what they know. Moreover, the use of computers makes diagnostic branching possible, so the response to one question might lead to a follow-up question to pinpoint or confirm an area of competence or weakness. Our work has progressed beyond the concepts set forth in the above-referenced patent, to provide for unique advantages and capabilities through a computerized figural response testing system and method. By the techniques that we have invented, we have met a number of needs. The computerized system and method of this invention provide greatly increased flexibility both in presentation of an item, and in method of response. This system also provides greatly increased reliability, e.g., less ambiguity in deciphering responses. It also provides a great improvement in automatic scoring, including the option of on-line scoring, i.e., providing the examinee with a score directly after completion of an item.

SUMMARY OF THE INVENTION

The objectives of automated and reliable presentation of figural response items, and the automatic scoring of completed items, are provided by the system and method of this invention. The invention utilizes a computerized means for presenting constructed-response questions or tasks on a video terminal, and is adapted to provide a greater flexibility and accuracy of scoring than prior art systems. The objects and advantages of the system and method are provided by a computer, such as a personal computer, with accompanying software. The computer system provides for selection of a task or item by the user; construction of the item on the video terminal, whereby figural information and other information are presented; means for enabling the user to respond by manipulating figural images and other elements in relation to the information on the screen; and means for providing scoring, both in terms of objective measurement of the accuracy and/or kind of response and also for diagnostically evaluating the sequence of the responses by the user. More specifically, the examinee, or user, is provided with a plurality of selectable tools for performing various tasks on the screen, which tasks are continuously displayed. The interactive nature of the constructed responses extends significantly the capability of measuring the proficiency of the user with respect to the targeted cognitive processes to be measured by the test.

BRIEF DESCRIPTION OF THE DRAWINGS

FIG. 4 is a flow chart of the steps for constructing the navigation screen as used in this invention.

DESCRIPTION OF THE PREFERRED EMBODIMENTS

As used herein, a figural response item is a task in which proficiency is expressed through the manipulation of figural material, e.g., graphs, illustrations, diagrams, textual and graphic symbols, and the like. The term item is an inclusive term, meaning the presentation of the problem statement and all screen presentations, movable and non-movable, as well as tools, prompts, etc. Also, as used herein, "symbol" and "object" are used interchangeably, and refer to any image or portion of image which is manipulated on the screen by the examinee. As used herein, manipulation refers to moving objects, generating new usages such as lines or arrowheads, and generally any operation available in the item at hand. In the practice of this invention, figural response items are delivered and scored by a computer. The computer may be a commercially available personal computer, or an equivalent, having the requisite memory capacity. The computer is used interactively, meaning that the user makes inputs, preferably through a mouse, which are stored in memory and displayed directly on an associated video terminal screen. In the preferred embodiment, the user utilizes a mouse or equivalent mechanism, for making choices of available tools and for making specific responses by manipulating graphics and/or text. As used herein, the term "pointing-device" means a mouse or equivalent, and can include, for example, a light pen.

Figure 9:
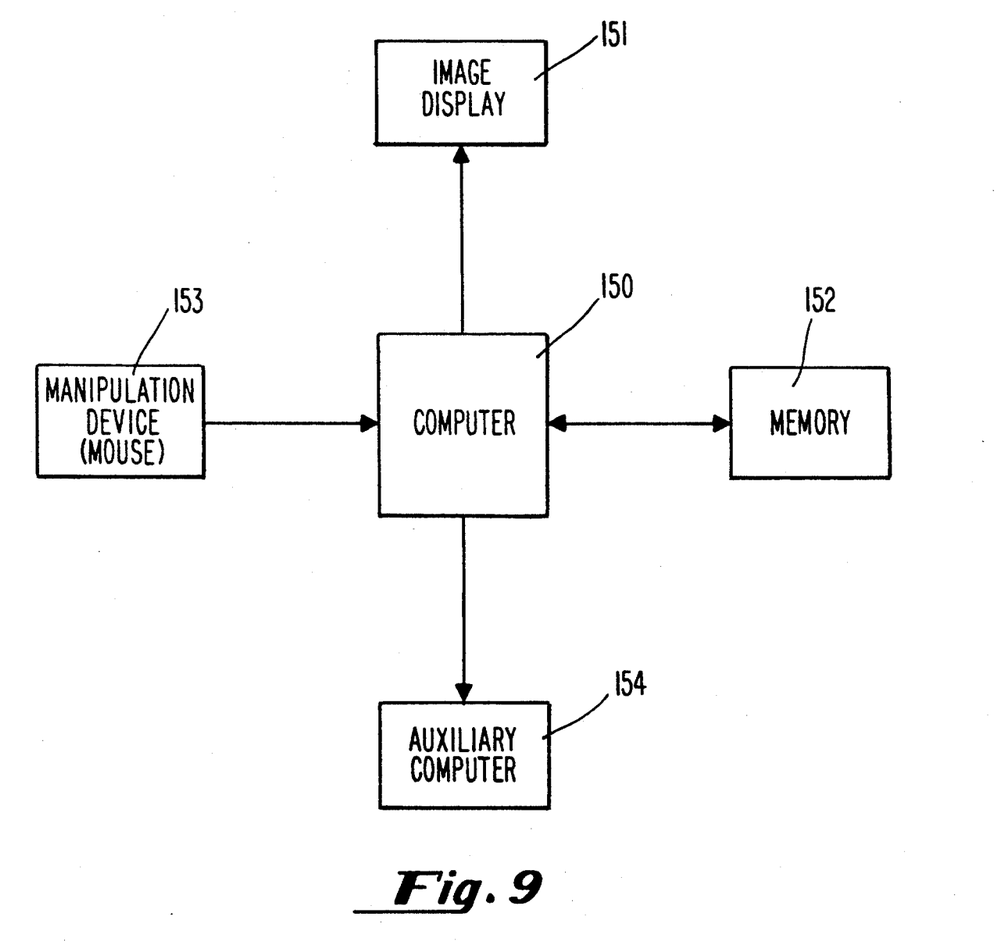
FIG. 9 is a block diagram showing the primary hardware components of the system of this invention.

FIG. 9 shows the primary hardware components of the system used for carrying out the subject invention. The computer 150 drives an image display screen 151. The image display presents the item to the examinee, i.e., presents the figural background and objects, provides symbols for the manipulation tools, and presents test instructions, as discussed in more detail hereinbelow. Computer 150 is interconnected with suitable memory 152, and standard manipulation of material presented on the display 151. An auxiliary computer, or second computer 154 may also be used for scoring or other record-keeping.

Figure 1:
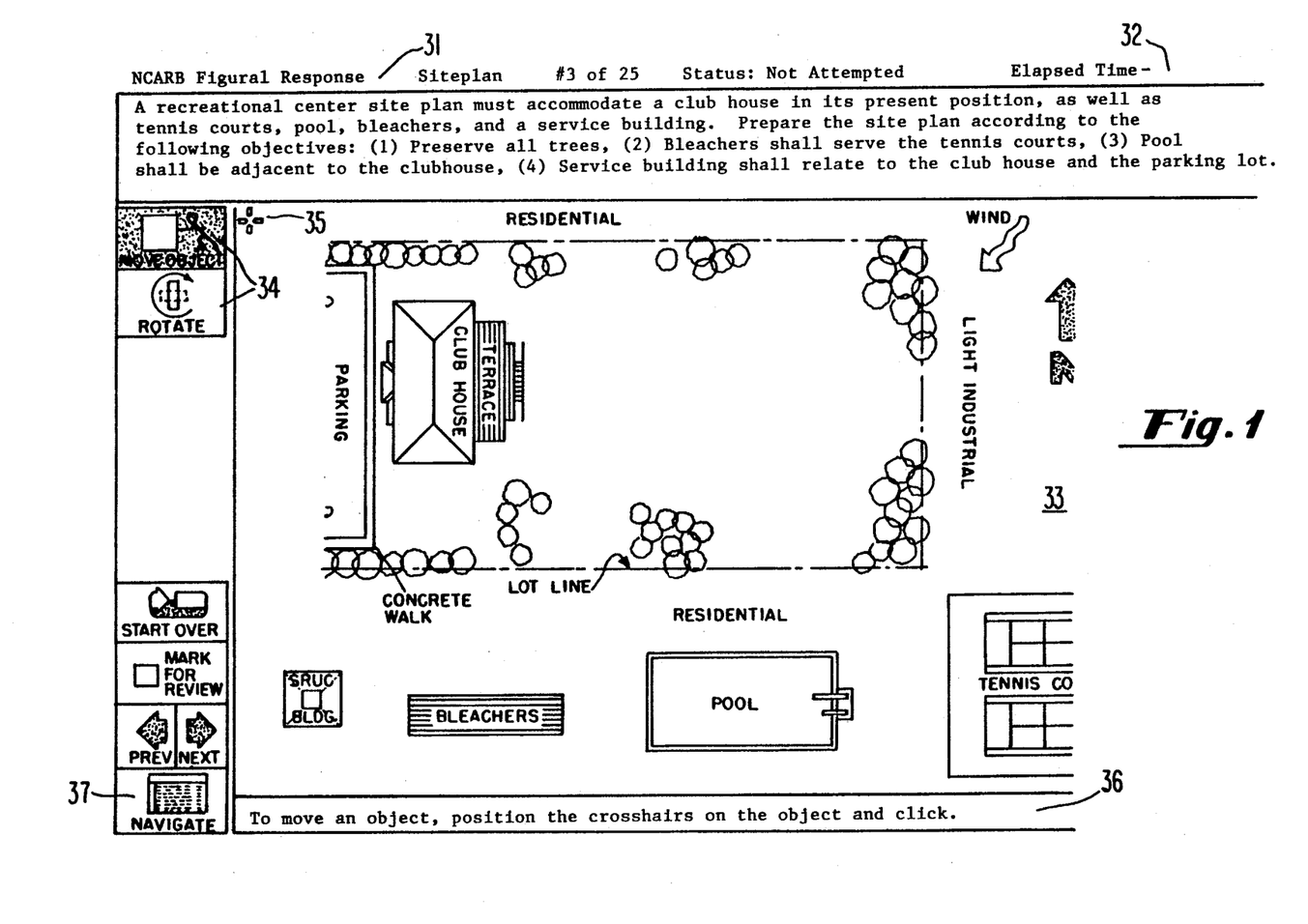
FIG. 1 represents a first item presentation on a video terminal screen, illustrating an architectural task designed to test knowledge of site planning.
Figure 2:
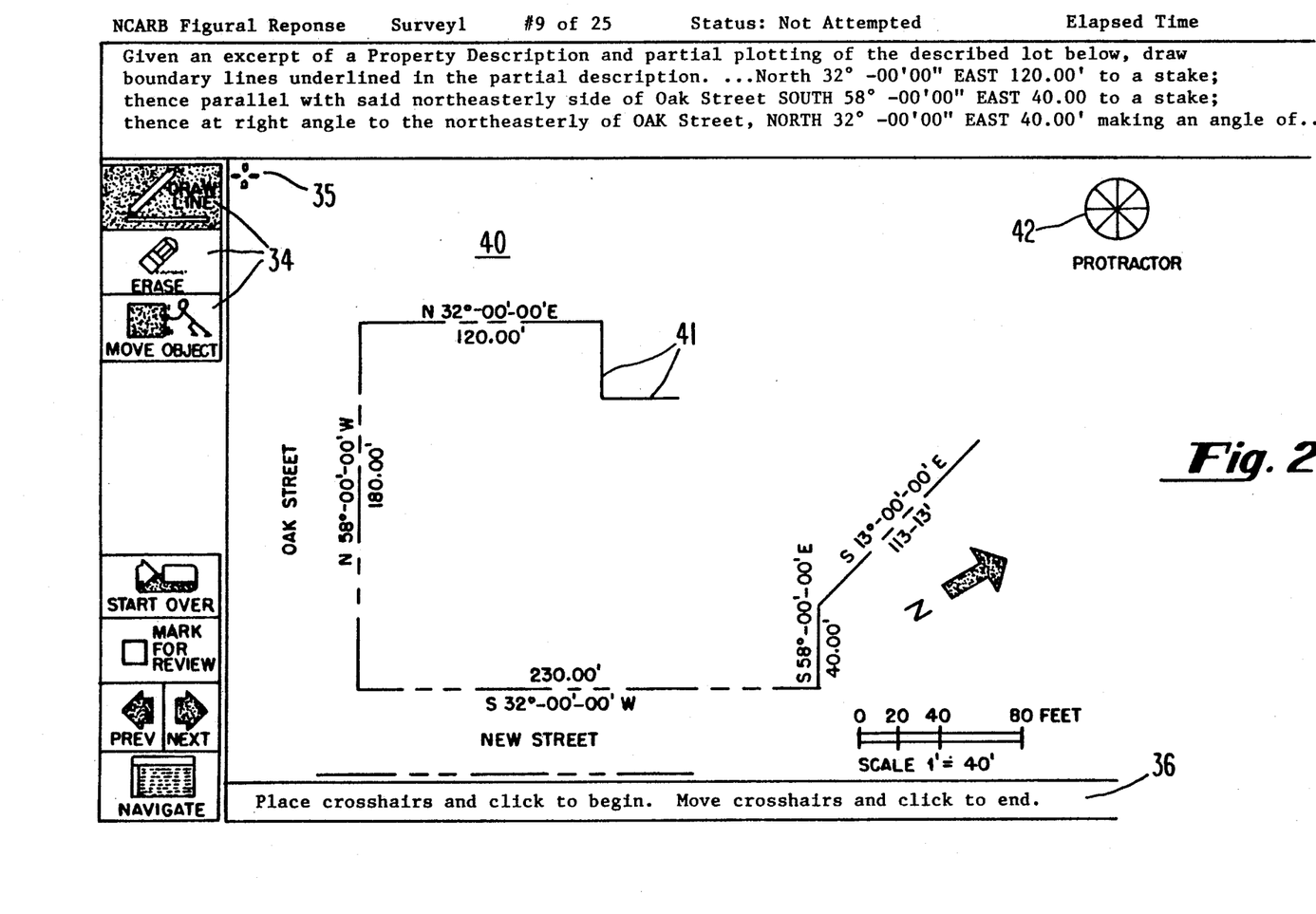
FIG. 2 represents a second item presentation on a screen, representing a survey task, with the correct response indicated in solid lines.

Referring to FIGS. 1 and 2, there are shown two illustrations of items delivered to a screen, for presentation to the user. The screen is presented as shown in each of the figures, and it is understood that the screen image is driven by a personal computer or equivalent, and manipulation of the screen material is performed by mouse input. The delivered item is defined in a parameter file, stored in the computer's memory, which file contains reference to graphic files (bitmaps and/or coordinates for vector graphics); tools for use by the user; text; locations of graphics and texts; and scoring parameters. These parameters will be further defined and discussed in connection with the examples given hereinbelow. The software used may be, for example, written in C language or a variant thereof, and utilizes interrupts generated by available mouse driver software, in a manner well known in the computer art area. The mouse or other equivalent means for interactive user response is a part of the preferred embodiment. The item parameter files, as well as the other software for performing the operations of this invention are stored in a conventional manner.

Referring first to FIG. 1, there is illustrated a siteplan form of an item for testing an architectural student. At the top of the screen there is presented an administrative status line 31, consisting of the test name; the item name and the item number out of total number of items (n of x); the status of the item, e.g., not attempted, attempted, marked, etc.; and elapsed time for the item and possibly other information, e.g., user ID. The question stem is presented at 32. As seen in FIG. 1, the question stem is a textual statement which sets forth given facts, and presents the task to the examinee. The response area 33 of the screen consists of both static background information and selectable and movable foreground information. For example, there is illustrated background graphics in the form of parking lot, club house, trees, and the lot line. There is background text indicating the type of adjacent properties (residential or light industrial, the concrete walk, etc.). Foreground graphics, in the nature of mouse-movable objects, are presented as the service building; the bleachers; the pool; and the tennis courts.

In the upper left-hand corner, there are shown two "tool buttons" 34. The tools are used to enable user manipulation of the screen in the course of responding to the tasks set forth. In FIG. 1, the tools are "move object" and "rotate" which provide corresponding functions. As seen in FIG. 2, additional tools "draw line" and "erase" are also provided. Other tools utilized in this invention include a tool to enable free-hand drawing; for labelling images; for drawing arrows; and for rubbing out various designated images. Of course, depending upon the item task, other tools may also be utilized. Returning to FIG. 1, the "move object" tool is preferably preselected when the item is first presented. However, the mouse pointer (a cross hairs in response area 40; an arrow when not in the response area) shown at 35 can be positioned and clicked on any available tool by the examinee, for selection of that tool. As indicated in the on-line help section 36 at the bottom of the screen, directional help is given to the user. In this case, the text states "To move an object, position the cross hairs on the object and click." Thus, if the operator wants to move the bleachers into a designated position, the cross hairs are moved over the bleachers object, clicked on the object, and then moved to the desired position. Rotation of the bleachers, or any other object, to an appropriate angle can be achieved by using the rotate tool with the mouse in a similar manner. Also as shown in FIG. 1 are administrative buttons, which are present throughout the item presentation. These buttons provide the functions of starting over, i.e, restarting the current item to its initial state; marking for review, which may be used by the examinee to tag an item for later review; "previous," used to navigate or move back to the previous item; "next," used to navigate to the text item; and "navigate," which returns the examinee to the navigation screen, where a menu of items is presented and where additional items can be selected for preview and then attempted.

Referring now to FIG. 2, there is shown a survey item, having background graphics illustrated at 40. In addition to three tools 34, a protractor 42 is also available for use by the examinee in drawing lines. In this case, the correct response has been indicated at 41, illustrated as solid lines. Typically, in responding to an item such as this, the examinee reads the question stem to determine what is required or asked for. The examinee looks at the response area 40, to determine the context of the response. In this case, the examinee views background graphics comprising an unclosed portion, or partial plotting of the lot. The examinee would typically select the draw line tool (if not preselected) to perform the task of filling in the first line which is described as being 40 feet in length and parallel to Oak Street. The protractor 42 could be used for purposes of drawing that line. Note also the graphic scale information, which enables the user to rather accurately determine the proper length of the line. Additionally, a scaled counter displays the current length of line segment as it is being drawn. The examinee response is achieved by using the mouse, or comparable pointing device, to draw the lines. If the examinee changes his or her mind, i.e., wants to change the direction or length of a line, this can be done by using the erase tool, followed by a subsequent drawing of a different line.

While these illustrations are relatively simple, it is appreciated that any degree of complexity can be built into such a task, and the items of both FIGS. 1 and 2 are illustrative only. The examinee has the choice of accepting the answer and moving to the next item, modifying the answer, or starting over. At any time the examinee can return to a prior item to review it, and to delete or modify the response as might be deemed appropriate. Responses are automatically saved when the item has been exited, whether exiting is by going to the navigation screen or by pressing the "previous" or "next" button. In a preferred embodiment of this invention, the solution path, or sequence of steps taken by the examinee in responding to an item, is recorded in memory, including the time duration of the response or any component of the response. Of course, the response itself also is recorded, for subsequent comparison to correct solution parameters and scoring, as discussed in more detail below.

Figure 3:
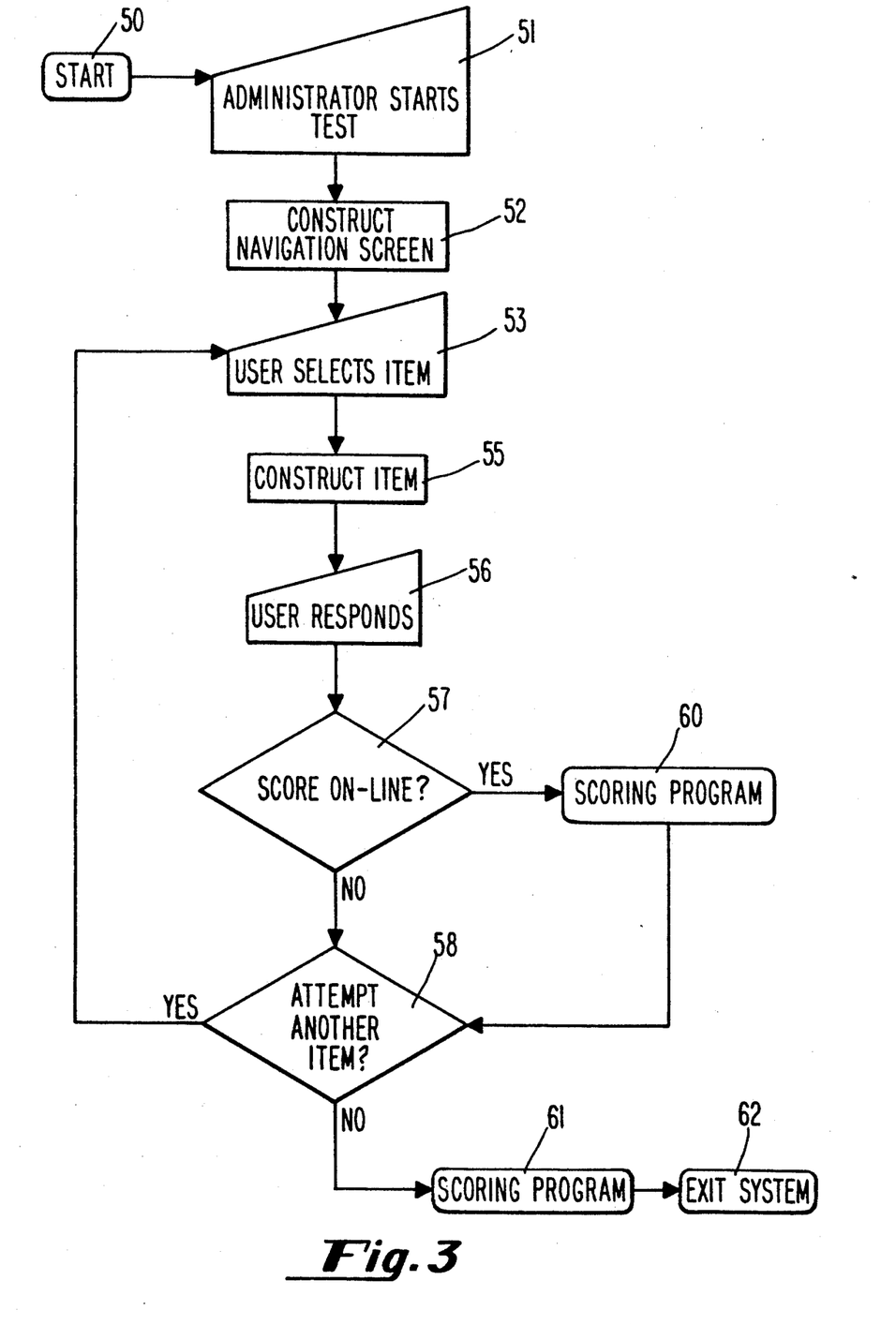
FIG. 3 is a flow chart of the steps taken in the overall method of selecting, constructing, responding to and scoring an item, and is representative of the software logic for carrying out the method.

Referring now to FIG. 3, the overall flow diagram of the system and method of this invention is presented. Following start of the program at 50 and 51, a navigation screen may be constructed and presented as illustrated at 52. The navigation screen presents a menu of items, and any other applicable information and instructions as may be necessary for the test, as set forth in more detail in FIG. 4. At 53, the user selects an item to proceed to, following which the software constructs the selected item as illustrated at 55. This step involves retrieving the applicable data from memory and presenting an item such as illustrated in FIG. 1 and FIG. 2, as set forth in more detail in FIG. 6. Following construction of the item, the examinee responds at 56 by manipulation of figural information, as set forth in the detailed flow diagram of FIG. 7. Following the user response, there is a determination at 57 of whether the response is to be scored on-line. If no, the user determines at 58 whether to attempt another item, and if so, the software proceeds to step 53 where the user selects another item. If on-line scoring is chosen, the scoring program is entered at 60. When no further item is to be attempted, the scoring program may be operated at 61 on any unscored item, and the system exits at 62.

In a preferred embodiment, the user responses, including responses to components of a task, are time-marked, i.e., the time is recorded in memory. By this means, the duration of each response can be determined for purposes of scoring.

Referring now to FIG. 4, the program for constructing the navigation screen starts at 64. Any desired background information is brought from memory and displayed at 65, and administrative information is likewise brought from memory and displayed at 66. At 67, a menu of items, with a description of each, is brought from memory and displayed to the user. This is a standard menu operation, giving information to the user from which a choice can be made. At 68 scroll buttons are generated from memory and displayed, if the navigation screen comprises more than one page. Likewise, at 69, navigation icons are fetched from memory and displayed. Following display of the entire navigation screen, the navigation screen construction process is ended at 70.

Figure 5:
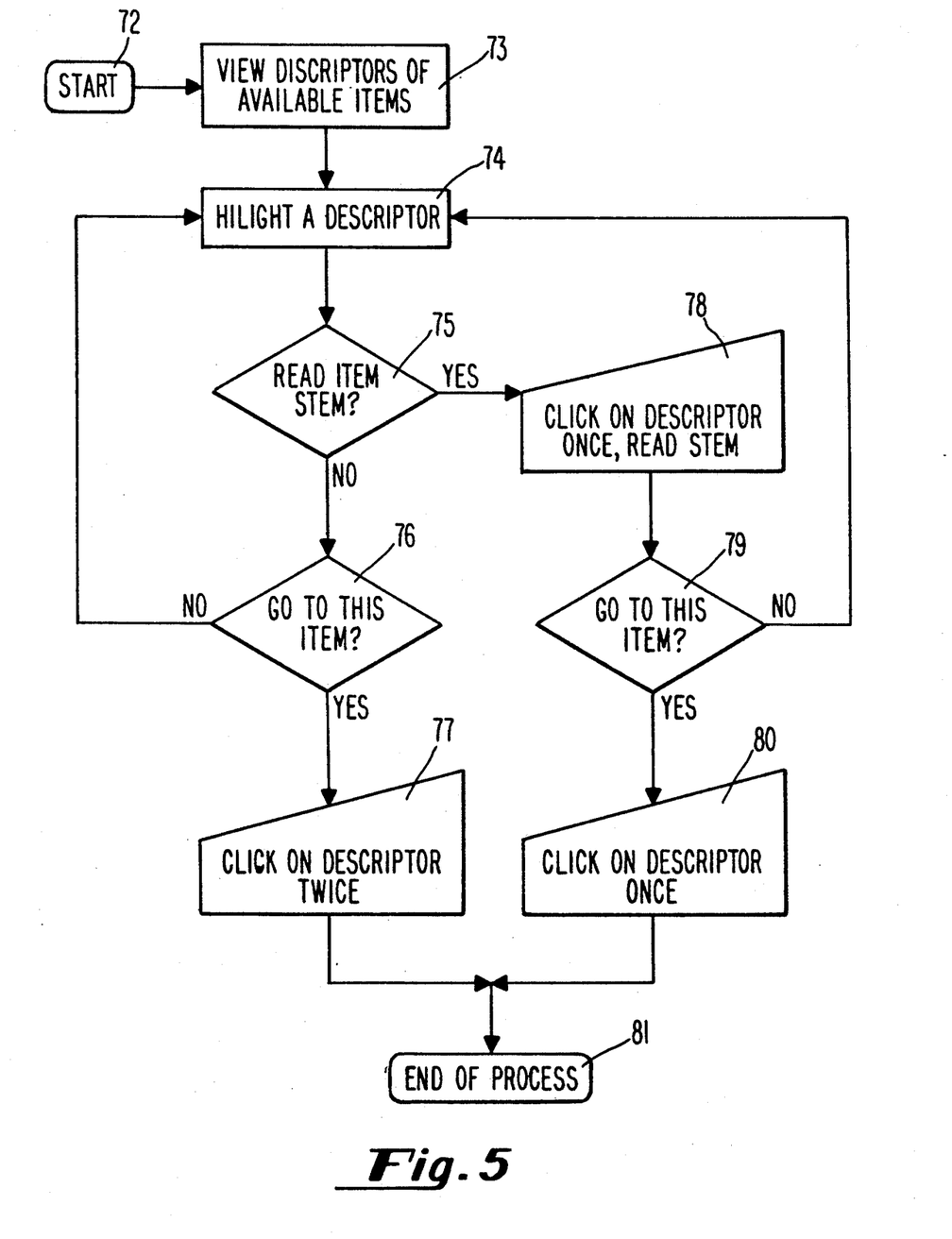
FIG. 5 is a flow chart for user selection of an item via the navigation screen, as used in this invention.

At FIG. 5, there is shown the flow diagram of the logical steps for user selection of an item from the navigation screen. Following a start at 72, the user views the descriptors of the available items at 73, as set forth at 67 on FIG. 4. The user can highlight a descriptor of an item at 74, by the use of conventional processor techniques. At 75, the user determines whether it is desired to read the item stem, i.e., verbal description of task at 32 (FIGS. 1 and 2). If no, at 76 the user decides whether to go directly to the item. If yes, the user clicks on the descriptor twice, as indicated at 77. If no, the user returns to step 74 and highlights another descriptor, repeating the sequence. If it is desired to read the item stem, the user utilizes the mouse to click on the highlighted descriptor once, as illustrated at 78. Having read the item stem, it is decided at 79 whether to go to this item. If no, the user highlights another descriptor as illustrated at 74. If yes, the user clicks the descriptor once, as illustrated at 80. Note that in each case, whether the stem is read or not, two clicks on the descriptor result in the choice of the item, and the process is ended at 81.

Figure 6:
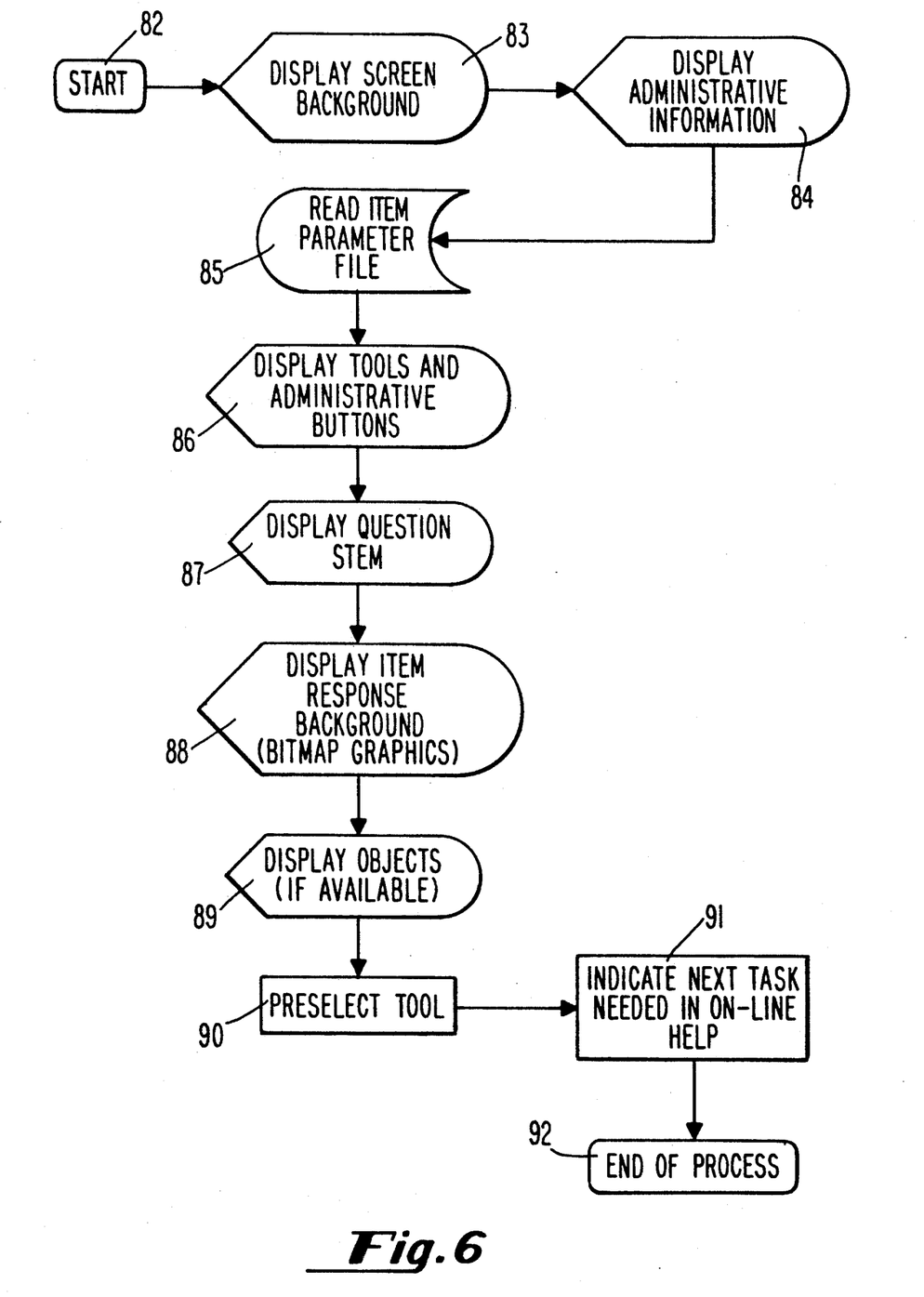
FIG. 6 is a flow chart of the steps for constructing and presenting an item to the user, as employed in this invention.

Referring now to FIG. 6, there are shown the process steps carried out by the computer software for constructing the item. After the start at 82, the display screen background is called from memory at 83 and presented on the screen. At 84, administrative information is called from memory and displayed on the screen. At 85, the item parameter file is read. Following this, the tools and administrative buttons are displayed as shown at 86; the question stem is displayed as shown at 87; the item response background is displayed as shown at 88; movable objects are displayed as shown at 89; and a first tool is preselected as shown at 90. Additionally, the on-line help text which is presented indicates the next task to be performed by the user. The construct item program is exited at 92.

Figure 7:
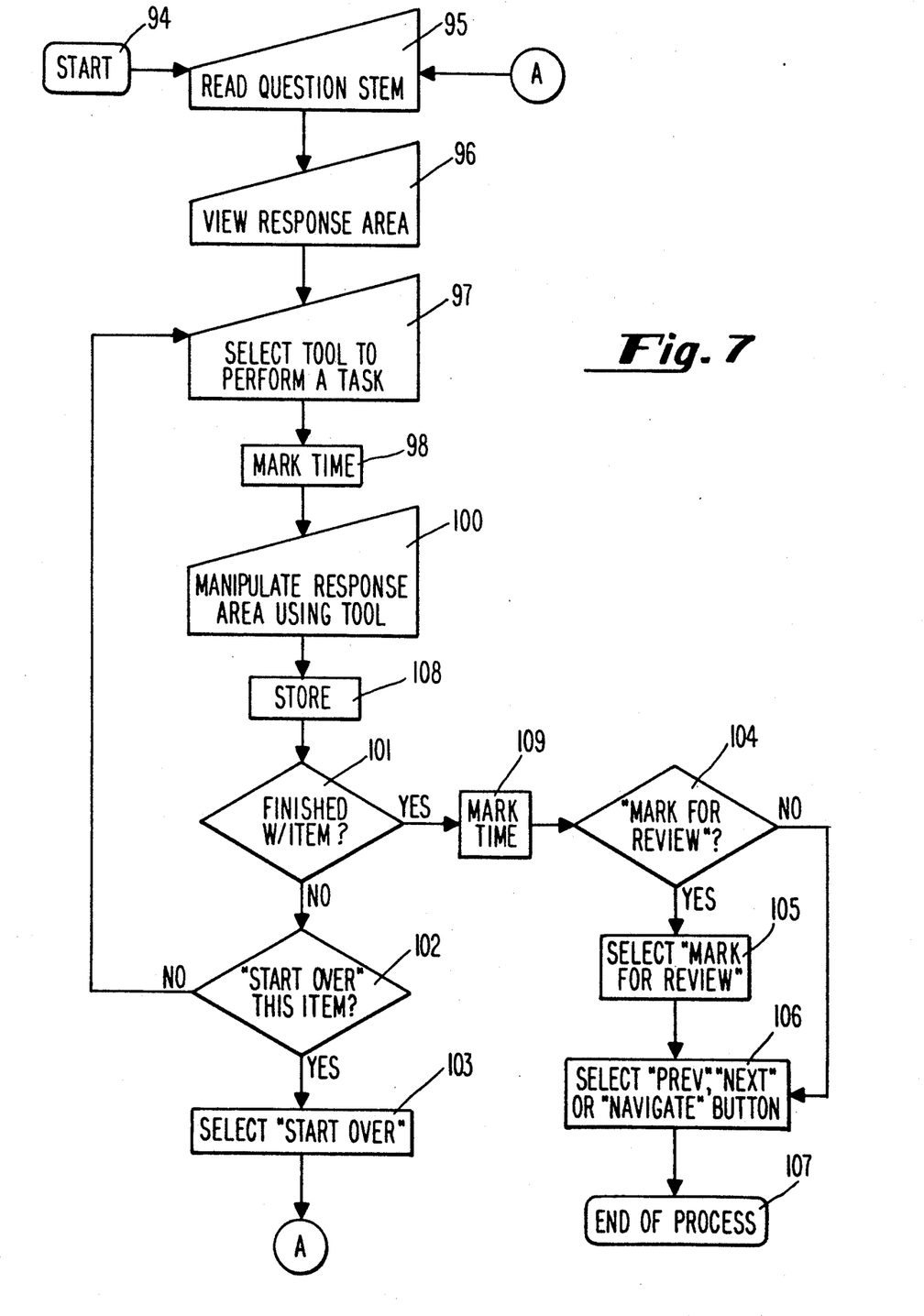
FIG. 7 is a flow chart of the user performed steps for responding to a presented item, in accordance with this invention.

Referring now to FIG. 7, there is shown a logic flow diagram of manipulation operations performed in the course of a typical response by the user. As stated above, manipulation refers to moving objects, generating new usages such as lines or arrowheads, and generally any operation available in the item at hand. After starting at 94, the user reads the question stem, as indicated at 95. He or she then views the response area (e.g., 33 as illustrated in FIG. 1), as indicated at 96. The user then utilizes the mouse to select a tool to perform a desired task, as shown at 97. At 98, the time of starting to use the tool to perform a task is marked. At 100, the tool is used to manipulate the response area. The mouse driver software is utilized in conjunction with stored software for each tool as the user performs an operation such as moving a foreground graphic image to a different position, drawing a line, placing an arrow head, etc. The response of the user is stored in memory at 108 concurrently with being displayed on the screen, and preferably there is continuous monitoring and storage of the lapsed time and sequence of steps. At 101, the user determines whether the item has been finished. If not, the user can decide whether or not to start over, as illustrated at 102. If the choice is yes, the examinee clicks the start-over button (shown at 37 in FIG. 1), as illustrated at step 103. In this case, the item is constructed again, and the user starts over at 95. If the choice at 102 is no, the examinee goes on to select another tool to perform an additional task. When it is determined at 101 that the item is finished the time is marked at 109. Then, the examinee decides at 104 whether to mark for review. If the answer is yes, the examinee selects the mark-for-review button (FIG. 1), and then goes on to the step illustrated at 106, of selecting the next item.

Figure 8:
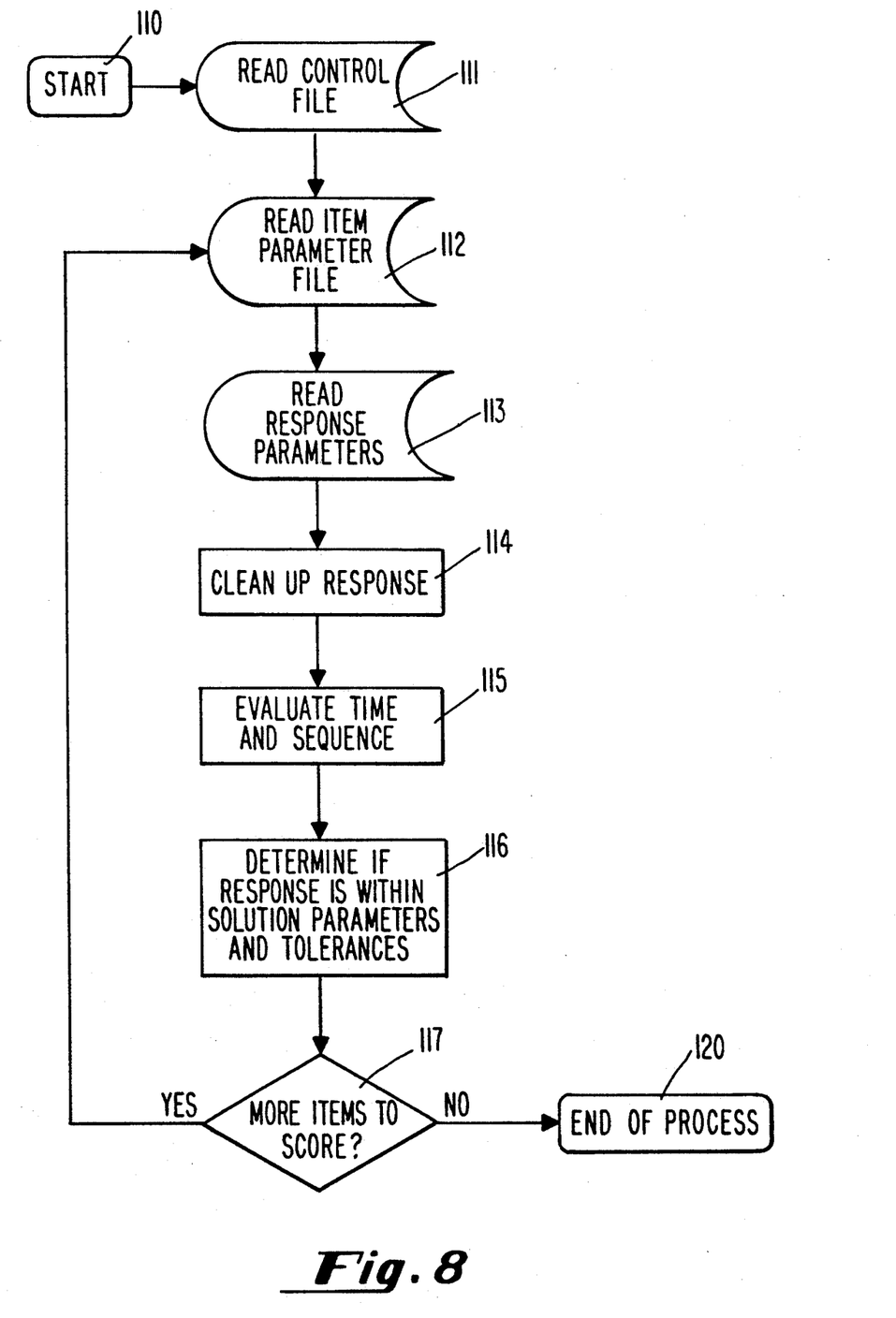
FIG. 8 is a flow chart of the scoring program as used in the operation of this invention.

Referring now to FIG. 8, there is shown a logic flow diagram of the scoring program. As discussed in connection with FIG. 3, scoring may suitably be done on-line, or it can be done at the end of the entire test. In either case, following starting of the scoring program at 110, the control file is read at 111. The control file is a prestored file which directs what item or items are to be scored. Following reading of control file, the item parameter file is read, as indicated at 112. The item parameter file contains the solution parameters, i.e., the prior designated correct responses, and the logic for scoring. As indicated at step 113, the response parameters inputted by the examinee are read. The response parameters include data regarding the type of object manipulated (e.g., line, object or icon, label, arrow, etc.); orientation of objects (e.g., rotation); location of objects; bitmapped image of entire screen; solution path, sequence or strategy; and time duration of response, changes (erasures), etc. At step 114 the response is cleaned up. The clean-up operation involves eliminating marks which are deemed irrelevant; determining what marks can be logically determined as errors and thus ignored; filling in gaps; adjusting for small user-induced mistakes such as curved lines that should be straight or vice versa, etc. At the block 115, the time and sequence of the examinee's responses, including response components, is evaluated. This is based upon the data stored at block 108 and the time marks generated at blocks 98 and 109 of FIG. 7.

As indicated at 116, the solution parameters and the response parameters are compared. At this step, it is determined whether each response coincides with the solution parameters or is within a recognizable tolerance of the solution parameters. Thus, referring to the illustration of FIG. 2, the direction, length and location of each of the response lines illustrated at 41 is compared with the correct direction, length and location. (Even given the provision of a protractor, some tolerance in the deviation of the direction from the correct direction can be accepted. Likewise, the length of the line can be accepted within a given tolerance.) In a similar manner, objects which have been rotated are compared to the correct angle of rotation. This determination step embraces any measurable comparison between the inputted user response and the predetermined stored solution. This step will frequently involve a comparison of the response to the figural background, and may further involve a logical analysis of the response compared to the background in order to determine the weighted correctness (partial credit) of the response. As indicated at 117, if there are more items to score, the program moves back to 112. If not, the program exits as indicated at 120.

The scoring at 116 also may include evaluating the time duration of responses. By processing the time-marks for each response component, the time duration is calculated and a time-based evaluation is made. Predetermined times corresponding to each response component are stored with the parameter file, and compared to the user time durations.

As stated above, the scoring logic steps for automatic scoring are stored in the item parameter file. The scoring instructions may comprise any predetermined steps for evaluating the examinee's responses, and are not limited in scope. Thus, the scoring instructions may direct the scoring operation to look for responses within on-screen coordinates; specific relationships between objects (e.g., bleachers are adjacent to tennis courts); may look for a predetermined sequence; and may look for a priority of responses. For example, the movement of a foreground object to a first location may be weighted as a most desirable response, while movement of such object to a secondary location may still be weighted as a good response but less than the first response. This relative valuation of responses enhances the diagnostic capability of the system.

What is claimed:

1. A method of figural response test taking employing an interactive computer system, said system having a computer and memory, an image display screen operatively connected to said computer, and means for manipulation of figural response symbols on said screen so as to modify the image thereon, said method comprising:

presenting starting figural material and figural response symbols on said screen, derived from first data stored in said memory, presenting a problem statement together with said presented starting figural material and said figural response symbols on said screen, derived from second data stored in said memory, requiring responses on said screen relative to said starting figural material, selecting at least one of said figural response symbols and inputting response data representative of an examinee's responses to said problem by manipulating said at least one selected figural response symbol on said screen by said manipulation means to provide a constructed figural response in relation to said starting figural material, and determining said relation by comparing the location and orientation of said constructed figural response with predetermined correct response data stored in said memory, and scoring said examinee's responses by said comparison.

2. The method of claim 1, wherein said response data is inputted to said computer and said scoring step is carried out by the same computer to which said response data has been inputted by an examinee.

3. The method of claim 1, wherein said response data is inputted to said computer and said scoring step is carried out by another computer.

4. The method as described in claim 1, further comprising storing a parameter file in said memory, said parameter file containing said predetermined correct response data which are the predetermined solution parameters, and further storing data representative of the examinee's response in a response file in said memory.

5. The method as described in claim 4, comprising using said computer to score the examinee's responses on-line.

6. The method as described in claim 1, wherein said scoring step comprises analyzing the order of responses inputted by the examinee in response to the presented problem.

7. The method as described in claim 1, wherein said selecting step further comprises selecting at least two of said figural response symbols, and wherein said scoring step further comprises comparing the relation of each manipulated figural response symbol with a predetermined correct response data.

8. The method as described in claim 1, further comprising evaluating the time duration of the examinee's response.

9. The method as described in claim 1, further comprising evaluating the time duration of a component of the examinee's response limited to manipulation of a respective figural response symbol.

10. The method as described in claim 1, further comprising time-marking the completion of each said examinee's response as it is made by the examinee, said scoring step further comprising evaluating said time-markings.

11. The method as described in claim 10, wherein each said examinee has a plurality of components, and further comprising time-marking each component of each said examinee response, said scoring step further comprising evaluating each component time-marking.

12. The method as described in claim 1, further comprising presenting a menu of items for the examinee to choose from.

13. The method as described in claim 1, further comprising the step of automatically moving to a next problem statement following completion of a problem statement by the examinee.

14. The method as described in claim 1, wherein said manipulation means comprises a pointing device to manipulate a figural response symbol on said screen.

15. The method as described in claim 14, further comprising storing each said examinee's response and the sequence of said examinee's response.

16. A method of figural response test-taking by responding to an item, said method employing an interactive computer system, said system having a computer with memory, an image display screen controlled by said computer, and mouse driver means for manipulation of figural response objects on said screen by the examinee, said method comprising:

storing item data corresponding to a problem statement, background figural material, foreground figural response objects which can be manipulated by the examinee, a plurality of selectable tools, solution data and instructions for scoring an examinee's response in said memory;

constructing an item on said screen, thereby providing a presentation of said problem statement, foreground figural response objects, background figural material, and selectable tools;

manipulating at least one of said foreground figural response objects to move and orient it relative to said background figural material in a manner selected by said examinee, said manipulating step including selecting at least one of said tools and utilizing said mouse driver means to operate said selected tool; and continually storing all manipulating steps made by the examinee, and scoring the examinee's response by comparing the positions and orientations of said moved foreground figural response objects with said solution data.

17. The method as described in claim 16, wherein said manipulating step further comprises using one of said tools to create a figural response object.

18. A computer system for interactive figural response test-taking, said system having a computer, a memory operatively connected to said computer and storing solution data, and an image display screen driven by said computer, said computer system further comprising:

means for constructing a test item on said screen, including presenting on said screen a problem statement, a figural background, figural response objects and selectable tools for performing specified tasks on said screen;

means for manipulating selected one of said figural response objects on said screen to orient said figural response object relative to said figural background, whereby an examinee makes responses to said problem statement; and means for scoring said examinee's responses by comparison of said manipulated figural response objects with said solution data.

19. The system as described in claim 18, wherein said solution data contains data representative of figural response object positions, and said scoring means comprises instructions for comparing said figural response object positions data and positions of said figural response objects after manipulation by the examinee.

20. The system as described in claim 18, comprising means for storing all manipulation steps made by said examinee.

21. The system as described in claim 18, wherein said manipulating means comprises means for erasing any part of the response that have been made by the examinee.

* * * * *